United States Patent [19]

Brown et al.

[11] Patent Number: 4,898,229

[45] Date of Patent: Feb. 6, 1990

[54] THERMOSTAT WITH INTEGRAL MEANS FOR DETECTING OUT-OF-PHASE CONNECTION OF A TWO-TRANSFORMER POWER SOURCE

[75] Inventors: Bernard T. Brown, St. Louis, Mo.; Donald E. Donnelly, Glen Carbon, Ill.; Bartholomew L. Toth, Crestwood, Mo.

[73] Assignee: Emerson Electric Co., St. Louis, Mo.

[21] Appl. No.: 247,492

[22] Filed: Sep. 22, 1988

[51] Int. Cl.$^4$ ............................................. G05D 23/00
[52] U.S. Cl. ................................. 165/11.1; 165/26; 165/27; 236/94; 361/35; 361/91
[58] Field of Search ......................... 165/11.1, 26, 27; 236/94; 361/35, 91

[56] References Cited

U.S. PATENT DOCUMENTS 3,093,771 6/1963 Carl et al. .............................. 361/35
4,739,436 4/1988 Stefani et al. ......................... 361/91

FOREIGN PATENT DOCUMENTS 0124226 9/1979 Japan ..................................... 361/35

Primary Examiner—John Ford
Attorney, Agent, or Firm—Paul A. Becker, Sr.

[57] ABSTRACT

A low-voltage space thermostat for controlling operation of a heating and cooling system is provided with integral circuit means for detecting the existence of an unacceptably high voltage potential between two wiring terminals therein. Such a high voltage potential exists when the power source in the system comprises two transformers connected out of phase with each other.

8 Claims, 1 Drawing Sheet

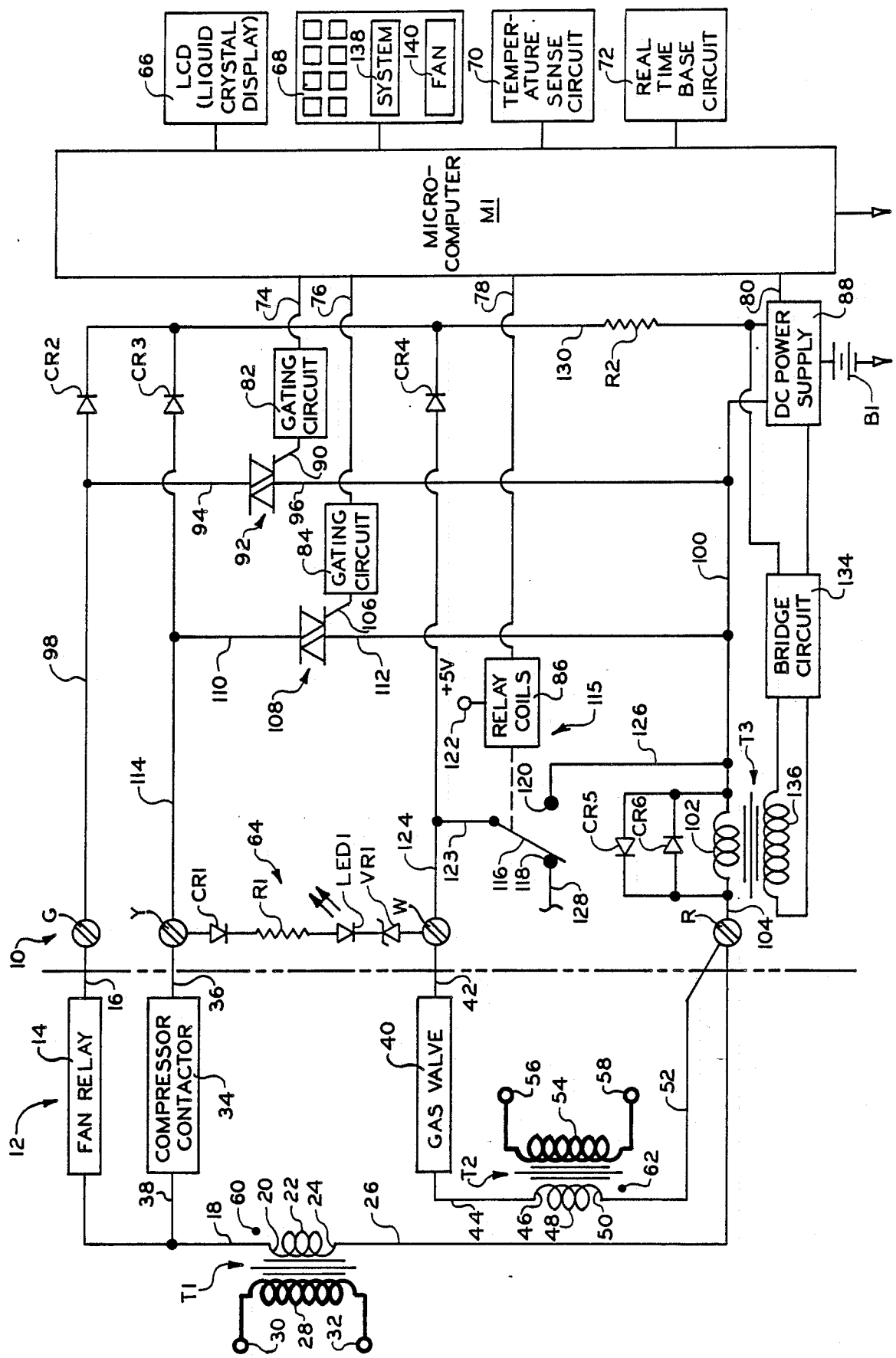

THERMOSTAT WITH INTEGRAL MEANS FOR DETECTING OUT-OF-PHASE CONNECTION OF A TWO-TRANSFORMER POWER SOURCE

BACKGROUND OF THE INVENTION

This invention relates to low-voltage space thermostats which control operation of single-stage heating and cooling systems.

Typically, in a single-stage heating and cooling system, the heating system includes a low-voltage operated gas valve which controls the flow of gas to the furnace; the cooling system includes a contactor having a low-voltage coil and high-voltage contacts which contacts control energizing of the compressor; and the circulation system includes a fan relay having a low-voltage coil and high-voltage contacts which contacts control energizing of the fan which circulates the conditioned air.

The electrical power for energizing such low-voltage operated devices is provided either by a single transformer or by two separate transformers. If the heating and cooling system is installed as a complete unit, generally a single transformer is provided. Such a single transformer has the required volt-ampere output to operate all the low-voltage operated devices. If the cooling system is added to an existing heating system, sometimes an additional transformer is used.

Specifically, in a system for heating only, a fan relay is generally not provided since the fan is generally controlled directly by a thermal switch on the furnace. Therefore, in a system for heating only, the only electrical load on the transformer is the gas valve. When the cooling system is added, the electrical load on the transformer increases due to the addition of the fan relay and the contactor. If the existing transformer does not have the required volt-ampere output to operate all the low-voltage operated devices, an additional transformer is required. It is noted that generally, in anticipation of the existing transformer not having the required volt-ampere output to handle such additional electrical load, a transformer is provided as part of the hardware in an add-on cooling system package. If the transformer is required due to the increased electrical load, it is used; however, even if the additional transformer is not required, it is generally used so as to simplify the electrical wiring involved in the installation of the add-on cooling system.

It is desirable that a low-voltage space thermostat for controlling a single-stage heating and cooling system be constructed so as to enable it to be readily usable with either the single-transformer or two-transformer power source. While use with the single-transformer power source poses no problem, a potential problem can arise when used with the two-transformer power source. Such a potential problem is that the two transformers might be connected to the thermostat in such a manner so that they are out of phase with each other whereby the voltages at the secondary windings would aid each other and thereby effect an unacceptably high value of voltage potential between various wiring terminals in the thermostat. For typical transformers having a rated 24 volt RMS secondary voltage, this unacceptably high value is approximately 68 volts peak voltage.

The most commonly used prior-art approach to negating this potential problem has been to incorporate means for electrically isolating the secondary windings of the two transformers from each other. For example, in a known prior-art construction, typified in U.S. Pat. No. 4,049,973, five wiring terminals are provided in the thermostat. Two of the thermostat terminals, isolated from each other with respect to the internal circuitry of the thermostat by a multi-position system selector switch, are normally connected together at the terminals by a removable wire jumper. When the heating and cooling system uses a single transformer, the wire jumper is retained, and one end of the secondary winding of the single transformer is connected to one of the two jumper-connected terminals. The other end of the secondary winding is connected through the fan relay, gas valve, and contactor to the remaining three terminals. When the heating and cooling system uses two transformers, the wire jumper is removed, and one end of the secondary winding of one of the transformers is connected to one of the two terminals previously connected by the wire jumper, and one end of the secondary winding of the other transformer is connected to the other of the two terminals previously connected by the wire jumper. The other end of the secondary winding of one of the transformers is connected through the gas valve to one of the three remaining terminals, and the other end of the secondary winding of the other transformer is connected through the fan relay and contactor to the remaining two terminals. Since the two terminals previously connected by the wire jumper are electrically isolated from each other, the secondary windings of the two transformers are therefore also isolated from each other.

While the above-described construction negates the potential problem created by two transformers being connected out of phase, it uses five thermostat terminals. As will be described hereinafter, a particular thermostat, constructed so as to provide automatic changeover between heating and cooling, results in a construction which, for economy, uses only four terminals. The use of such a four-terminal thermostat with a single-transformer power source poses no problem. However, when such a four-terminal thermostat is used with a two-transformer power source, one end of the secondary winding of each transformer is connected to a single terminal and the other ends of the secondary windings are connected through the fan relay, gas valve, and contactor to the remaining three terminals, whereby, if the two transformers are out of phase, an unacceptably high voltage potential exists between certain ones of the three remaining terminals.

Correcting this out-of-phase condition requires simply that the voltage polarity of one of the transformers be reversed. This can readily be accomplished either by reversing the primary or secondary leads of one of the transformers at the transformer location or by reversing specific connecting wires at the thermostat. While there is no particular problem in correcting the out-of-phase condition, in the manner described above, there is a problem in detecting the existence of such out-of-phase condition. It is noted that the out-of-phase condition could be detected by checking the voltage, such as with a volt meter, between the various thermostat terminals. However, since thermostats are often installed by do-it-yourself homeowners who may not have equipment such as a volt meter, it is believed desirable that other detecting means, requiring no specific equipment, be provided.

SUMMARY OF THE INVENTION

An object of this invention is to provide a generally new and improved low-voltage space thermostat for controlling operation of a single-stage heating and cooling system, which thermostat includes integral means for detecting an out-of-phase connection of the transformers in a two-transformer system.

In accordance with the present invention, there is provided a space thermostat with circuit means, including a voltage regulator and an LED (light emitting diode), connected between two terminals therein. When the thermostat is used to control a two-transformer heating and cooling system, one end of the secondary winding of one of the transformers is connected through the compressor contactor to one of the two terminals, and one end of the secondary winding of the other transformer is connected through the gas valve to the other of the two terminals. The other ends of the secondary windings of both transformers are connected to a common terminal. If the transformers are connected out of phase with each other, the secondary voltages of the two transformers aid each other. When the thermostat is not calling for heating or cooling, this voltage appears between the two terminals connected by the voltage regulator and the LED. This voltage causes the voltage regulator to break over and conduct, thus enabling the LED to be energized. The installer is instructed to reverse the polarity of one of the two transformers if the LED is energized. When the transformers are connected in phase, the secondary voltages of the two transformers do not aid each other. Under this condition, the voltage between the two terminals connected by the voltage regulator and the LED cannot reach the breakover voltage value of the voltage regulator. Also, when a single-transformer system is being controlled, the voltage regulator does not break over since the voltage difference between the two terminals connected by the voltage regulator and the LED, which voltage difference is based on the secondary voltage of the single transformer, is always well below the breakover voltage value of the voltage regulator.

The above-mentioned and other objects and features of the present invention will become apparent from the following description when read in conjunction with the accompanying drawing.

BRIEF DESCRIPTION OF THE DRAWINGS

The single FIGURE of the drawing is a schematic illustration, largely in block form, of a thermostat incorporating the present invention and shown connected to heating and cooling apparatus including two transformers, and wherein the two transformers are connected to the thermostat in such a manner so that they are out of phase with each other.

DESCRIPTION OF THE PREFERRED EMBODIMENT

Referring to the drawing, shown generally at 10 is a programmable electronic thermostat for controlling operation of single-stage heating and cooling apparatus shown generally at 12. Thermostat 10 is provided with terminal screws G, Y, W, and R to which the heating and cooling apparatus 12 are connected.

Heating and cooling apparatus 12 includes a fan relay 14 which is connected by a lead 16 to terminal G, and by a lead 18 to one end 20 of the low voltage secondary winding 22 of a first voltage step-down transformer T1. The other end 24 of secondary winding 22 is connected by a lead 26 to terminal R. The primary winding 28 of transformer T1 is connected across terminals 30 and 32 of a conventional 120 volt alternating current power source.

Apparatus 12 further includes a compressor contactor 34 which is connected by a lead 36 to terminal Y, and by a lead 38 and lead 18 to end 20 of secondary winding 22 of transformer T1.

Apparatus 12 further includes a gas valve 40 which is connected by a lead 42 to terminal W, and by a lead 44 to one end 46 of the low voltage secondary winding 48 of a second voltage step-down transformer T2. The other end 50 of secondary winding 48 is connected by a lead 52 to terminal R. The primary winding 54 of transformer T2 is connected across terminals 56 and 58 of a conventional 120 volt alternating current power source. It is noted that the primary windings 28 and 54 of transformers T1 and T2, respectively, can be connected across the same 120 volt alternating current power source rather than across separate sources as shown.

Dots 60 and 62 at ends 20 and 50 of secondary windings 22 and 48, respectively, indicate the polarity of secondary windings 22 and 48.

In thermostat 10, connected between terminals Y and W is a circuit 64 which enables the detection of an out-of-phase connection to thermostat 10 of transformers T1 and T2. Circuit 64 includes the series connection of a rectifier CR1, a resistor R1, and LED 1 (light emitting diode), and a voltage regulator VR1.

While thermostat 10 may take many forms in embodying the invention, a preferred construction is shown in the drawing. For brevity, only those features believed necessary or helpful in understanding the present invention are shown and hereinafter described.

Thermostat 10 includes a programmable microcomputer M1. In the preferred embodiment, microcomputer M1 is an NEC μPD7503, which is a CMOS 4-bit single chip device and which includes an ALU (arithmetic logic unit), an accumulator, a 4096×8-bit ROM (read only memory), a 224×4-bit RAM (random access read/write memory), an 8-bit timer/event counter, a display controller/driver, and 23 I/O (input/output) lines.

Connected to microcomputer M1 are an LCD 66 (liquid crystal display), a keypad 68, a temperature sense circuit 70, and a real time base circuit 72.

LCD 66 provides a plurality of display elements for designating time and temperature plus various other information. Keypad 68 comprises a matrix switch having individual keys which enable the user to program microcomputer M1 so as to provide a desired time-temperature schedule of operation of thermostat 10. Temperature sense circuit 70 includes a thermistor (not shown) in circuit with an oscillator (not shown), the output frequency of which is a function of the ambient temperature sensed by the thermistor. This frequency is measured by microcomputer M1 and converted to a measurement of degrees of temperature. Real time base circuit 72 includes a crystal oscillator (not shown) and provides an accurate time base for all real time functions.

Also connected to microcomputer M1 by leads 74, 76, 78, and 80 are a gating circuit 82, a gating circuit 84, relay coils 86, and a DC power supply 88, respectively.

Gating circuit 82 is connected to the gate 90 of a controlled solid state switch comprising a triac 92 having main terminals 94 and 96. Main terminal 94 is connected to terminal G by a lead 98. Main terminal 96 is connected to terminal R through a lead 100, the primary winding 102 of a voltage step-up transformer T3, and a lead 104.

Gating circuit 84 is connected to the gate 106 of a controlled solid state switch comprising a triac 108 having main terminals 110 and 112. Main terminal 110 is connected to terminal Y by a lead 114. Main terminal 112 is connected to terminal R through lead 100, primary winding 102, and lead 104.

Relay coils 86 comprise a pair of coils in a latching relay 115 having a movable contact 116 and a pair of fixed contacts 118 and 120. The relay coils 86 are connected at 122 to a 5 volt source provided by DC power supply 88. Movable contact 116 is connected to terminal W by leads 123 and 124. Contact 120 is connected to terminal R through a lead 126, lead 100, primary winding 102, and lead 104. Contact 118 is connected to additional circuitry (not shown) by a lead 128.

As will be hereinafter described, DC power supply 88 is effective to provide a continuous output voltage of approximately 5 volts to microcomputer M1 at lead 80. To effect this function, DC power supply 88 is connected to terminal G through a dropping resistor R2, a lead 130, a rectifier CR2, and lead 98; to terminal Y through resistor R2, lead 130, a rectifier CR3, and lead 114; to terminal W through resistor R2, lead 130, a rectifier CR4, and lead 124; and to terminal R through lead 100, primary winding 102, and lead 104. DC power supply 88 is also connected through a bridge circuit 134 to the secondary winding 136 of transformer T3. The impedance of primary winding 102 of transformer T3 is quite small in comparison to the impedance of the fan relay 14, the compressor contactor 34, and the gas valve 40. The voltage drop across primary winding 102, when any of those devices are energized, is quite small so that sufficient voltage appears across those devices to effect proper energizing thereof. To further ensure such sufficient voltage, a pair of rectifiers CR5 and CR6 are connected in opposite polarity across primary winding 102 so as to limit the voltage drop thereacross to approximately 0.6 volts.

Also connected to DC power supply 88 is a battery power source B1 comprising, in the preferred embodiment, three 1.5 volt alkaline batteries. Battery power source B1 is effective to maintain program memory and clock function in microcomputer M1 in the event of a lengthy electrical power failure.

As previously described, dots 60 and 62 indicate the polarity of secondary windings 22 and 48 of transformers T1 and T2, respectively. With the polarity of secondary windings 22 and 48 as shown in the drawing, when thermostat 10 is not calling for heating or cooling or fan operation, and at any specific time in the AC sine wave of the voltage at secondary winding 22 or 48, the voltage at terminals G and Y is a specific value of one polarity and the voltage at terminal W is a specific value of the opposite polarity. The rated secondary voltage of each of transformers T1 and T2 is 24 volts RMS (34 volts peak voltage) which is the normal operating voltage of fan relay 14, compressor contactor 34, and gas valve 40. The breakover voltage of voltage regulator VR1 is approximately 47 volts. Therefore, when the voltage at terminal Y is 23.5 volts positive, the voltage at terminal W is 23.5 volts negative, resulting in a voltage difference of 47 volts between terminals Y and W. Under this condition, voltage regulator VR1 breaks over and conducts, thus effecting energizing of LED 1. Rectifier CR1 prevents current flow through LED 1 when the polarity between terminals Y and W reverses, thus protecting LED 1 against the application of such reverse voltage. Resistor R1 is of such a value, approximately 3900 ohms, so as to limit the current flow between terminals Y and W to a sufficiently low value so as to prevent energizing of compressor contactor 34 and gas valve 40. Although LED 1 conducts only during portions of one-half of the AC sine wave, it appears to be constantly illuminated since the frequency is 60 Hz.

Thus, the illumination of LED 1 indicates that transformers T1 and T2 are out of phase with each other. While such an out-of-phase condition has no adverse effect on normal operation of thermostat 10, it results in an unacceptably high value of voltage potential, approximately 68 volts peak voltage, between terminals G and W and between terminals Y and W, which terminals could be touched by the user. Accordingly, if LED 1 is illuminated, the user is instructed to reverse the polarity of one of the transformers T1 and T2.

The simplest method of reversing the polarity is to interchange leads 42 and 52, resulting in lead 42 being connected to terminal R and lead 52 being connected to terminal W. Other methods, methods that could be followed by a competent service technician, include: reversing the connections at terminals 30 and 32 of primary winding 28 of transformer T1; or reversing the connections at terminals 56 and 58 of primary winding 54 of transformer T2; or reversing leads 18 and 26 connecting secondary winding 22 of transformer T1; or reversing leads 44 and 52 connecting secondary winding 48 of transformer T2.

It is to be noted that while the use of LED 1 enables an economical construction and is the preferred indicating means, other indicating means could be utilized. For example, some thermostats incorporate an audio device, such as a beeper, for indicating, for example, that the batteries, such as in battery power source B1, are discharged to an unacceptably low value. When such an audio device is already provided, it could, by providing minor circuit modifications, also be economically utilized to perform the indicating function.

It is noted that if apparatus 12 uses a single-transformer power source, fan relay 14, compressor contactor 34, and gas valve 40 would be connected to terminals G, Y, and W, respectively, in the same manner as shown in the drawing. One end of the secondary winding of the single transformer would be connected to fan relay 14, compressor contactor 34, and gas valve 40, and the other end of the secondary winding would be connected to terminal R. With such an arrangement, the voltage between any of the terminals G, Y, W, and R could never exceed the secondary voltage of the single transformer and thus could never effect illumination of LED 1.

Operation of thermostat 10 is controlled by a set of instructions programmed into the ROM of microcomputer M1, and by information entered into the RAM of microcomputer M1 by the user by means of keypad 68. By proper manipulation of the various keys in keypad 68, the user can establish a desired time-temperature schedule for controlling heating and cooling apparatus 12. Typical apparatus and method for establishing such a desired time-temperature schedule is shown in U.S. Pat. No. 4,308,991.

In thermostat 10, the system selector switch, designated at 138, is a key in keypad 68 and is operable to provide a HEAT mode, a COOL mode, an OFF mode, and an AUTO mode. In the HEAT mode, thermostat 10 is effective to control the heating apparatus so as to maintain the space temperature at the selected heating set point temperature value. In the COOL mode, thermostat 10 is effective to control the cooling apparatus so as to maintain the space temperature at the selected cooling set point temperature value. In the OFF mode, thermostat 10 prevents energizing of the heating and cooling apparatus. In the AUTO mode, thermostat 10 is effective to maintain the space temperature between two user-selected set point temperature values by automatically actuating the heating apparatus or the cooling apparatus, whichever is required to maintain the space temperature between the two user-selected set point temperature values. For example, if the two user-selected set point temperature values are 70° F. and 75° F., thermostat 10 will automatically actuate the heating apparatus when the space temperature drops below 70° F. and will automatically actuate the cooling apparatus when the space temperature rises above 75° F.

In thermostat 10, the fan switch, designated at 140, is also a key in keypad 68. Fan switch 140 is operable to provide an AUTO mode, wherein the fan relay 14 is energized whenever the compressor contactor 34 is energized, and an ON mode, wherein the fan relay 14 is continuously energized. Fan switch 140 is also operable, by proper manipulation of the fan switch 140 during programming by the user and with fan switch 140 in the AUTO mode position after programming, to cause the fan relay 14 to be continuously energized during a specific time period. It is to be noted that when fan switch 140 is in the AUTO mode position and the system is in the heating mode with the system selector switch 138 in either the HEAT mode or AUTO mode position, the circulating fan (not shown) is controlled by a thermal switch (not shown) in the furnace, rather than by fan relay 14, except during those specific time periods in which the fan relay 14 is programmed to be continuously energized.

With system selector switch 138 in the HEAT mode position, thermostat 10 provides an enabling signal on lead 78 whenever it senses, by means of temperature sense circuit 70, that heating is required. The enabling signal on lead 78 effects energizing of one of the latching relay coils 86 so as to cause relay contact 116 to make contact with relay contact 120. With contact 120 made, gas valve 40 is energized by the secondary winding 48 of transformer T2. When the heating requirement is satisfied, an enabling signal is provided on lead 78 to effect energizing of the other of the latching relay coils 86 so as to cause relay contact 116 to break contact with contact 120. With contact 120 open, gas valve 40 is deenergized.

With system selector switch 138 in the COOL mode position, thermostat 10 provides an enabling signal on lead 76 whenever it senses that cooling is required. The enabling signal on lead 76 effects, through gating circuit 84, conduction of triac 108. With triac 108 conducting, compressor contactor 34 is energized by the secondary winding 22 of transformer T1. When the cooling requirement is satisfied, the enabling signal on lead 76 no longer appears, and triac 108 becomes nonconductive.

With system selector switch 138 in the AUTO mode position, thermostat 10 provides an enabling signal on lead 78 whenever heating is required and an enabling signal on lead 76 whenever cooling is required.

As previously described, continuous energizing of fan relay 14 is to be effected when fan switch 140 is in the ON mode position. Also, when fan switch 140 is in the AUTO mode position, energizing of fan relay 14 is to be effected whenever the compressor contactor 34 is energized or whenever the instant time is in a specific time period during which thermostat 10 has been programmed to provide continuous energizing of fan relay 14. Whenever energizing of fan relay 14 is required, thermostat 10 provides an enabling signal on lead 74. The enabling signal on lead 74 effects, through gating circuit 82, conduction of triac 92. With triac 92 conducting, fan relay 14 is energized by the secondary winding 22 of transformer T1. When energizing of the fan relay 14 is not required, an enabling signal does not appear on lead 74, and triac 92 is non-conductive.

Power to DC power supply 88 is supplied by transformer T3 through bridge circuit 134 whenever fan relay 14, compressor contactor 34, or gas valve 40 are energized. Specifically, whenever relay contacts 116 and 120 are closed whereby gas valve 40 is energized, or triac 108 is conductive whereby compressor contactor 34 is energized, or triac 92 is conductive whereby fan relay 14 is energized, sufficient current flows through primary winding 102 of transformer T3 to effect the value of voltage and current in the secondary winding 136 required to supply power to DC power supply 88 whereby DC power supply 88 is effective to provide a 5 volt power source to microcomputer M1 at lead 80.

When gas valve 40, compressor contactor 34, and fan relay 14 are deenergized, power to DC power supply 88 is supplied by secondary windings 22 and 48 of transformers T1 and T2, respectively. Specifically, secondary winding 22 provides power through a first circuit including fan relay 14, rectifier CR2, dropping resistor R2, and primary winding 102 of transformer T3, and through a second circuit including compressor contactor 34, rectifier CR3, resistor R2, and primary winding 102. Secondary winding 48 provides power through gas valve 40, rectifier CR4, resistor R2, and primary winding 102. These circuits supply sufficient power to DC power supply 88 to enable DC power supply 88 to provide a 5 volt power source to microcomputer M1 at lead 80.

Thus, regardless of whether or not fan relay 14, compressor contactor 34, or gas valve 40 are energized, DC power supply 88 is effective to provide a continuous output voltage of approximately 5 volts to microcomputer M1 at lead 80.

It is noted that it is the automatic changeover feature which requires that gas valve 40 and compressor contactor 34 be separately controlled, such as by latching relay 115 and triac 108, respectively. It is further noted, however, that while such separate control is most efficiently effected in a four-terminal construction as described herein, such separate control could also be effected in a five-terminal construction.

Specifically, thermostat 10 could be modified by adding another wiring terminal and another relay. To effect such modification, lead 26 would be disconnected from terminal R and connected to an additional wiring terminal. Lead 104 would be disconnected from terminal R and connected to the movable contact of an additional single-pole, double-throw relay. One fixed contact of the relay would be connected to terminal R, and the other fixed contact of the relay would be connected to the additional wiring terminal. The relay coil would be connected to microcomputer M1. Additionally, main terminal 96 of triac 92 would be disconnected from lead 100 and connected to the additional wiring terminal. Also, a wire jumper would be connected between terminal R and the additional wiring terminal. The wire jumper would be retained when thermostat 10 was used with a single-transformer power source and would be removed when used with a two-transformer power source. When used with a two-transformer power source, when thermostat 10 would call for heating, the relay coil of the additional relay would be energized to cause the movable relay contact to make with the fixed relay contact connected to terminal R thereby enabling energizing of gas valve 40 whenever contacts 116 and 120 of latching relay 115 would be closed. When thermostat 10 would call for cooling, the relay coil of the additional relay would be energized to cause the movable relay contact to make with the fixed relay contact connected to the additional wiring terminal thereby enabling energizing of compressor contactor 34 whenever triac 108 would be conductive. Fan relay 14 would be energized whenever triac 92 was conductive. When used with a single-transformer power source, thermostat 10 would operate in the same manner. In such a five-terminal construction, the automatic changeover feature and all other operating features of thermostat 10 would be retained. Also, transformers T1 and T2 would no longer be connected to a common terminal so that the possibility of the secondary voltages of transformers T1 and T2 aiding each other so as to effect the previously described unacceptably high voltage potential between various terminals would be eliminated. Thus, detecting circuit 64 could be removed. However, the added cost due to the additional relay would be such that the cost of the five-terminal construction would be considerably more than the cost of the four-terminal construction.

We claim:

1. In a thermostat for controlling operation of heating and cooling apparatus, which apparatus includes a plurality of low-voltage operated devices and transformer means for energizing the low-voltage operated devices,
   a plurality of wiring terminals within said thermostat to which the low-voltage operated devices and the transformer means are connected; and
   circuit means connected between two of said terminals for detecting a voltage potential therebetween of approximately twice the normal operating voltage of said low voltage operated devices,
   said detecting circuit means including a series connection of an LED and a voltage regulator, said voltage regulator being effective to break over and enable said LED to be illuminated when said voltage potential of approximately twice the normal operating voltage of said low-voltage operated devices exists.

2. The thermostat claimed in claim 1 wherein said detecting circuit means further includes a rectifier and a resistor connected in series with said LED and said voltage regulator.

3. In a thermostat for controlling operation of heating and cooling apparatus, which apparatus includes a plurality of low-voltage operated devices and transformer means for energizing the low-voltage operated devices,
   a plurality of wiring terminals within said thermostat to which the low-voltage operated devices and the transformer means are connected;
   switching means connected between individual ones and a single one of said terminals for separately controlling energizing of each of said low-voltage operated devices; and
   circuit means connected between two of said individual ones of said terminals for detecting a voltage potential therebetween of approximately twice the normal operating voltage of said low-voltage operated devices,
   said detecting circuit means including a series connection of an indicating means and voltage break-over means, said voltage break-over means being effective to break over and enable energizing of said indicating means when said voltage potential of approximately twice the normal operating voltage of said low-voltage operated devices exists.

4. The thermostat claimed in claim 3 wherein said voltage break-over means comprises a voltage regulator.

5. The thermostat claimed in claim 3 wherein said indicating means comprises an LED.

6. In a thermostat adapted to be used for controlling heating and cooling apparatus, which apparatus includes a plurality of low-voltage operated devices and transformer means for energizing the low-voltage operated devices, and which transformer means comprises two transformers,
   a plurality of wiring terminals within said thermostat to which the low-voltage operated devices and the transformer means are connected; and
   circuit means connected between two of said terminals for detecting a relatively high voltage potential therebetween,
   said relatively high voltage potential existing when said transformer means comprises the two transformers connected out of phase with each other,
   said detecting circuit means including means for indicating the existence of said relatively high voltage potential.

7. In a thermostat for controlling operation of heating and cooling apparatus, which apparatus includes a plurality of low-voltage operated devices and transformer means for energizing the low-voltage operated devices,
   a plurality of wiring terminals within said thermostat to which the low-voltage operated devices and the transformer means are connected; and
   circuit means connected between two of said terminals for detecting a voltage potential therebetween of approximately twice the normal operating voltage of said low-voltage operated devices,
   said transformer means comprising two transformers,
   said detecting circuit means being effective to indicate existence of said voltage potential of approximately twice the normal operating voltage of said low-voltage operated devices when said two transformers are connected out of phase with each other.

8. In a thermostat for controlling operation of heating and cooling apparatus, which apparatus includes a plurality of low-voltage operated devices and transformer means for energizing the low-voltage operated devices,
   a plurality of wiring terminals within said thermostat to which the low-voltage operated devices and the transformer means are connected;
   switching means connected between individual ones and a single one of said terminals for separately controlling energizing of each of said low-voltage operated devices; and
   circuit means connected between two of said individual ones of said terminals for detecting a voltage potential therebetween of approximately twice the normal operating voltage of said low-voltage operated devices, said detecting circuit means including means for indicting the existence of said voltage potential of approximately twice the normal operating voltage of said low-voltage operated devices, said transformer means comprising two transformers, said thermostat being adapted to be connected to said two transformers at said single one of said terminals thereby resulting in a common connection of said two transformers, said voltage potential of approximately twice the normal operating voltage of said low-voltage operated devices being caused to exist in the event said common connection results in said two transformers being out of phase with each other.

* * * * *